Dec. 29, 1925.
J. H. FLATLEY
1,567,434
HAY LOADER
Filed July 31, 1920
2 Sheets-Sheet 1
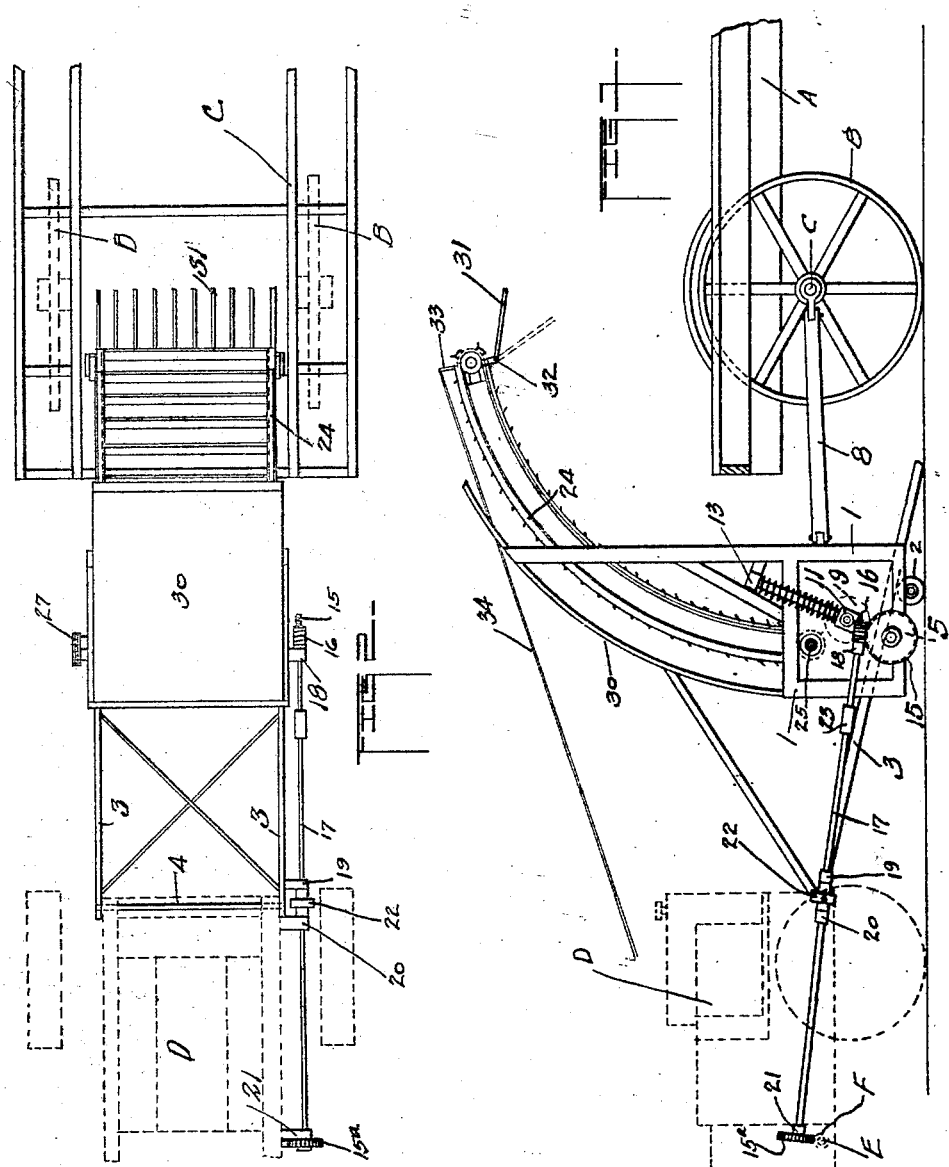

Dec. 29, 1925.
J. H. FLATLEY
HAY LOADER
Filed July 31, 1920
1,567,434
2 Sheets-Sheet 2
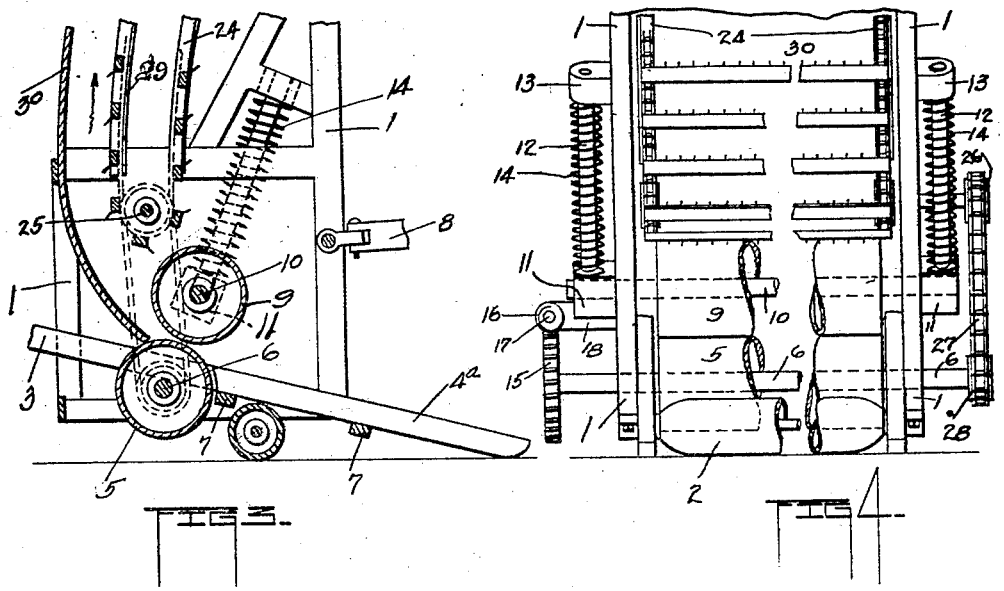
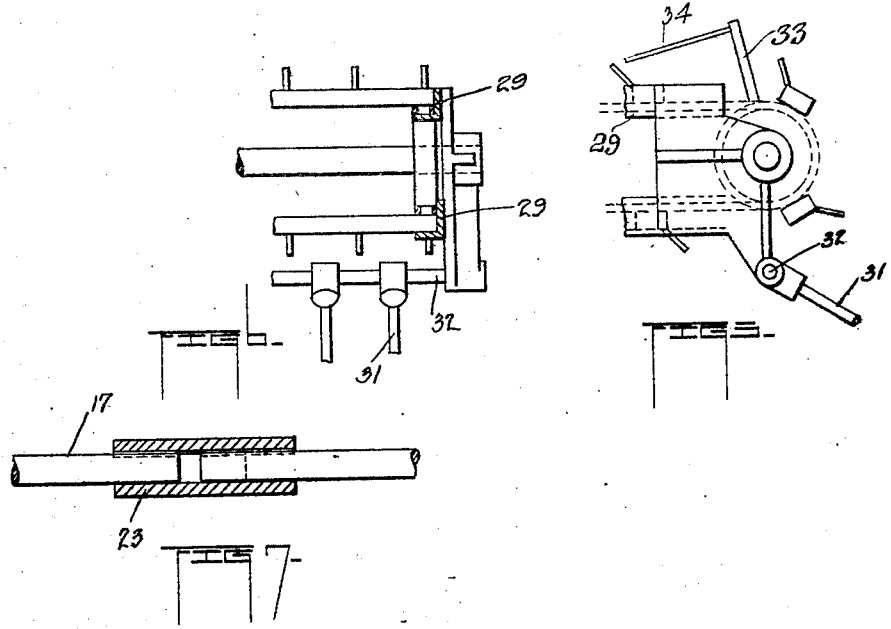
INVENTOR
John Henry Flatley
BY
ATT'Y.

Patented Dec. 29, 1925.

1,567,434

UNITED STATES PATENT OFFICE

JOHN HENRY FLATLEY, OF LITTLE YORK, ILLINOIS.

HAY LOADER.

Application filed July 31, 1920. Serial No. 400,419.

*To all whom it may concern:*

Be it known that I, JOHN HENRY FLATLEY, a citizen of the United States, a resident of Little York, in the county of Warren and State of Illinois, have invented new and useful Improvements in Hay Loaders, of which the following is a specification.

This invention has reference to hay loaders, and has for its principal object, to provide for attaching the loader to a motor propelled vehicle to be pushed by the latter, and for operating the loading elements from the engine of the motor vehicle.

The invention has for a further object, to provide a hay loader which is arranged to have connection with a hay-rack to trail the latter, and having means to connect the loader with a tractor, and also means to operate the loading elements from the engine of the tractor.

A further object of the invention is to provide the loader with a traction roller to facilitate easy movement of the loader over the ground, and to provide the loader with compressing rollers adapted to press the loose hay into a compact ribbon mass so that it may be piled evenly on the hay-rack to which it is conveyed by a suitable elevator.

That the invention may be more fully understood, reference is had to the accompanying drawings forming a part of the description, illustrating a preferred embodyment of the invention, in which:—

Figure 1 is a greatly reduced side elevation of a hay loader embodying my invention, the same being shown attached to a hay rack to trail therebehind, and also coupled to a tractor employed, both to push the loader and operate the loading elements of the loader;

Figure 2 is a plan view of Figure 1;

Figure 3 is a vertical sectional view through the lower or receiving end of the loader.

Figure 4 is a front elevation, broken in two, of the lower or receiving end of the loader;

Figure 5 is a detail showing a side elevation of the upper or discharge end of the loader;

Figure 6 is a rear view, partly in section and partly broken, of Figure 5, and

Figure 7 is a detail partly in section showing the extensible driving shaft connecting the loader with the engine of the tractor.

Like characters of reference denote corresponding parts throughout the figures.

So far as I am aware, hay loaders have been constructed to be drawn by the rack onto which the hay is loaded; including operating connections for actuating the loading elements from the ground wheels of the rack. Such an arrangement not only puts the pulling strain on the team of horses, pulling the rack and loader, but also utilizes the team as the motive power for imparting movement to the wheels of the rack, which is in turn imparted to the loading elements through the operating connections between the rack and the loader. My invention provides for the horses to draw the rack and guide it in its movement, reliance being placed upon the tractor to push the loader and supply the motive power to actuate the loading elements of the loader, including the compressing means thereof. The traction roller of the loader enables the loader to travel over rough and uneven ground with comparative ease and dispatch. Further, the operating connection between the loader and the tractor is such that the loader may adapt itself to ground conditions without affecting the driving connection with the tractor.

I have shown only so much of a hay rack and tractor as is necessary to illustrate the connections therewith, and the means for operating the loading elements from the engine of the tractor. The hay rack is designated A, provided with the traction wheels B and the axle C. D designates the tractor of any suitable make, having a countershaft E driven in any suitable manner from the engine, not shown, and on said countershaft is carried a worm F.

The hay loader comprises the side frames 1 mounted upon the traction roller 2 which extends crosswise of the frame and having the bottle shaped ends which permit the roller to adapt itself easily to the unevenness of the ground over which the loader moves. Connected to the side frames are bars 3, which at their rear ends are preferably pivotally connected to a rod 4 extending transversely of and connected in a suitable manner to the tractor frame. Such pivotal connection of the bars 3 with the tractor frame, provides a flexible connection with the loader frame and the tractor frame, which will permit the loader to adapt itself to the unevenness of the ground. The bars 3 extend forwardly of the loader frame and constitute two members of a rake for directing the hay to the compressing and loading means of the loader, the remaining members of the rake, which are designated 4ª, Figure 3, stop short of a compressing roller 5, carried by a transverse shaft 6 journaled in immovable bearings on the loader frame. These rake members 4ª may be connected to cross-bars 7 or secured to the frame of the loader in any other suitable maner.

A reach bar 8, see Figure 1, is arranged to couple the loader with the axle C of the hay rack.

Co-operating with the compression roller 5 is a compression roller 9. This last mentioned roller is carried by a transverse shaft 10 journaled in movable bearings 11, the frame being slotted as shown in Figure 3, to permit up and down movement of the shaft 10. The bearings 11 have connected thereto, rods 12 which pass through suitable bearing blocks 13 attached to or forming a part of the frame of the loader, and around said rods 12, are carried springs 14, which bear one end against the bearings 11 and the other or opposite ends against the bearing blocks 13. The normal position of the compression roller 9 is slightly spaced above the compression roller 5, so that as the loader moves forwardly and the members of the rake pass under the hay, the hay is directed into the loader and between the compression rollers 5 and 9, which tend to compress the hay into a ribbon-like mass, the roller 9 being yieldingly held in relation to the roller 5 by means of the springs 14, whereby the hay as it passes between the rollers, will be fed to the elevator for conveying the hay to the hay rack in a compact flat mass. The springs 14, as will be understood, may be of such strength as to apply sufficient tension to hold the roller 9 to its work, or sufficiently light to permit such vertical movement in its relation to the roller 5, as may be desired. In other words, the stronger the springs, the more compact will be the hay; and the lighter the springs, the less compact will be the same.

The roller 5 is the driving member of the two rollers, and the roller 9 acts as an idler. The roller 5 is driven directly from the engine of the tractor. I accomplish this by providing the shaft 6 of the roller 5 with the worm wheel 15, with which meshes a worm 16 on a driving shaft 17, and with a worm wheel 15ª which meshes with the worm F. The forward end of the shaft 17 is journaled in a bearing 18, secured to the loader frame, also in a bearing 19 secured to one of the side bars 3 and in bearings 20 and 21, suitably connected with the frame of the tractor. The shaft 17 is preferably formed in three sections, the rear and intermediate sections being connected by a universal coupling 22 of any standard make, and the intermediate and forward sections of said shaft in the sleeve 23, see Figure 7, where the intermediate section of the shaft is shown keyed to the sleeve and the forward end of the shaft is feathered therein. The universal coupling 22 will allow for any variation between the loader and the tractor as the same moves over the ground, and for variations of the loader relatively to the tractor, or vice versa, where it is necessary for extensive movement of the shaft 17, which is taken care of by the sleeve 23, as will be understood.

The elevator for receiving and transferring the hay from the compressing means of the loader on to the hay rack, is designated 24, and includes the usual chain raddle bars and fingers of the usual and well known type in devices of this character, the chains being driven from a transverse shaft 25, on which are carried the sprocket wheels for operating the chains of the elevator, said shaft being journaled in suitable bearings secured to the frame. On one end of the shaft 25 is carried a sprocket wheel 26 engaged by a sprocket chain 27, operated by a sprocket wheel 28 on the end of the shaft 6, opposite to that on which is carried the worm wheel 15. The lower end of the elevator, as shown in Figures 2 and 3, is located in proximity to the compressing roller 9 and in position so that the fingers on the raddle bars of the elevator will pick up the hay as the same is passed between the compressing rollers 5 and 9 and convey the same to the discharge end of the elevator. I prefer to construct the elevator so that it describes an arc of a circle, the chains of which travel over the angle bars 29 so arranged as to guide the chains of the elevator, as shown.

The hay as it is elevated, is guided by the curved shield 30 which extends from the lower end of the loader, see Figures 1 and 3, to a point near the discharge end of said loader. I prefer to discharge the hay on to the swingable slatted deflector 31, the use of which, when swung into its different positions as shown in full and dotted lines in Figure 1, is to insure a regular distribution of the hay on to the hay rack so as to avoid bunching of the hay. The arms of the deflector 31 are connected with the rod 32, to which is connected a crank 33 having connected thereto, a rope or cable 34 which may extend back within convenient reach of the operator of the tractor, who may regulate the position of the deflector to insure a proper and even distribution of the hay on to the hay rack.

It is believed the relation of the loader to the hay rack and the tractor, as well as the operation of the loader instrumentalities from the tractor power is well understood without further or more detailed description, and while I have elected to show and describe a preferred embodiment of the invention, it is understood changes in structure may be made without departing from the spirit and scope of the invention.

What I claim is:

1. In an apparatus of the character described, in combination with a hay loading implement including elevating means and compressing means in the mouth of the elevating means, an attachment to connect the loader to a tractor to be pushed by the latter, and operating means to connect the elevating and compressing means of the loader with the tractor power.

2. In an apparatus of the character described, in combination with a hay loading implement including elevating means and compressing means for compressing loose hay into a compact ribbon mass, an attachment to connect the loader to a tractor to be pushed by the latter, operating means to connect the elevating and compressing means of the loader with the tractor power, and means operable from the tractor to evenly distribute the ribbon mass of hay, as it is discharged from the loader.

3. In an apparatus of the character described, in combination with a hay loading implement including elevating means and compressing means at the mouth of the elevating means to compress loose hay into a compact ribbon mass to be delivered to the elevating means, an attachment to connect the loader to a tractor to be pushed by the latter, operating means to connect the elevating and compressing means of the loader with the tractor power, and means operable from the tractor to evenly distribute the ribbon mass of hay, as it is discharged from the loader.

In witness whereof, I have hereunto affixed my hand and seal this 30th day of June, 1920.

JOHN HENRY FLATLEY.